United States Patent [19]

Nelson

[11] 4,165,088

[45] Aug. 21, 1979

[54] COMBINATION CART

[76] Inventor: Dale W. Nelson, 375 N. 400 East, Orem, Utah 84057

[21] Appl. No.: 879,070

[22] Filed: Feb. 21, 1978

[51] Int. Cl.² .................................................. B63B 3/02
[52] U.S. Cl. .................................. 280/47.35; 280/79.3
[58] Field of Search .............. 280/47.35, 47.34, 47.18, 280/47.19, 47.24, 79.3, 79.1 A; 248/346; 211/189, 184; 108/91, 53.1, 53.3, 53.5, 91, 29, 56.3, 901; 296/3

[56] References Cited

U.S. PATENT DOCUMENTS

| | | | |
|---|---|---|---|
| 1,893,227 | 1/1933 | Cohen-Venezian | 280/79.3 |
| 2,201,533 | 5/1940 | Goldman | 280/47.35 |
| 2,311,422 | 2/1943 | Walling | 280/47.34 |
| 2,936,984 | 5/1960 | Skubic | 108/53.5 |
| 2,953,388 | 9/1960 | Keller | 280/47.24 |
| 3,137,250 | 6/1964 | Hutchinson | 280/47.34 X |
| 3,582,102 | 6/1971 | Bewick | 108/53.3 |

FOREIGN PATENT DOCUMENTS 15505 3/1956 Fed. Rep. of Germany .............. 296/3

*Primary Examiner*—John A. Pekar
*Attorney, Agent, or Firm*—Criddle, Thorpe & Western

[57] ABSTRACT

A multiple use cart comprising a hollow horizontal flat deck having tapered vertical apertures open at both ends interconnecting the top and bottom portions of the deck. The apertures may be in longitudinal and transverse alignment or otherwise arranged. Mounted to the bottom of the deck are a set of swivelable front wheels and a set of fixed rear wheels. Handle means are secured to the deck. Any combinations of tubular carrying means tapered at the bottom to fit into any desired number of apertures may be utilized depending upon the particular use of the cart.

11 Claims, 6 Drawing Figures

U.S. Patent  Aug. 21, 1979  Sheet 1 of 2  4,165,088
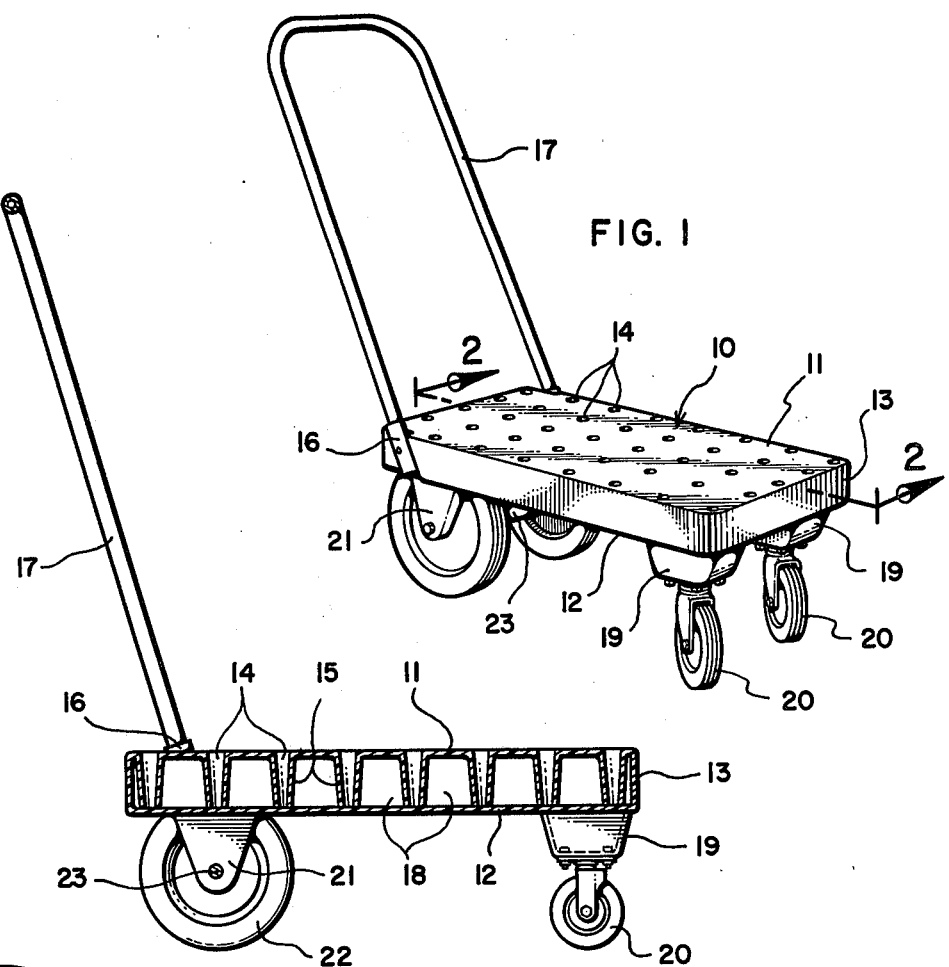
FIG. 1
FIG. 2
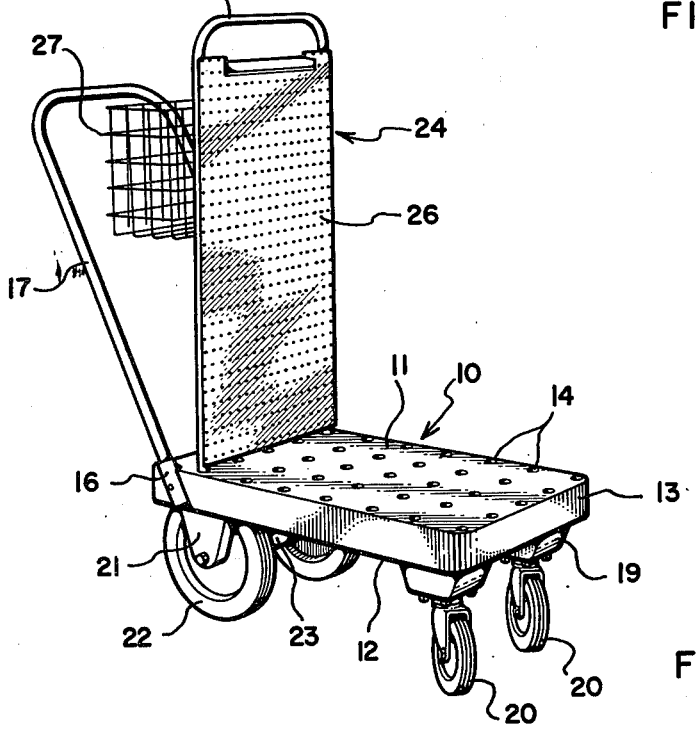
FIG. 3

COMBINATION CART

BACKGROUND OF THE INVENTION

This application relates to a multiple use utility cart having interchangeable units for converting the cart from one use to another.

There are many utility carts in commercial and home use. Each cart is designed for a specific purpose and is generally useful for one purpose only. Hence one cart may be useful for janitorial purpose, for gardening tools, for linens, as a luggage carrier, as an audio-visual cart, as a catering service cart, as an athletic equipment caddy, as a dolly for bulk materials, as a baby stroller, as a service cart, as a shopping cart, as a tool stand, as a trash collector, and the like, but not for a combination of any two or more uses.

It is highly disadvantageous to have multiple carts each of which is useful for one purpose only. Each cart is only in use when the need arises and is in storage the majority of the time. It is usually not econimical for small businesses and residential dwellings to have a multiplicity of carts. Even in larger businesses changing from one cart to another can be bothersome and time consuming.

OBJECTS AND BRIEF DESCRIPTION OF THE INVENTION

It is an object of the present invention to provide a utility cart capable of multiple uses.

It is also an object of the present invention to provide a utility cart capable of different uses which requires minimal storage space.

A further object of this invention is to provide accessories in the form of modular units adapted to be secured to the cart in such a manner as to allow for specific arrangements adapted to the use to be made of the cart.

Still another object of this invention is to provide a utility cart which can quickly be changed from one use to another.

These and other objects may be accomplished by means of a hollow horizontal flat deck mounted on wheels and containing a handle. The deck is unique in that it is formed as an integral unit having walled tapered apertures open at both ends interconnecting the upper and lower surfaces of the deck. The diameter of the apertures in the upper surface is larger than the diameter of the apertures in the lower surface. A solid outside wall is contiguous with the upper and lower surfaces around the perimeter thereof. The horizontal deck has means for mounting the handle thereto and contains means on the lower surface for mounting the wheels. Preferably a set of front wheels in the form of castors are swivelly mounted to the lower front surface of the deck and a set of larger rear wheels are mounted to the lower rear deck surface.

The apertures are walled in and provide a structural strength to the deck. The apertures extend over the entire surface of the deck and are in spaced relationship in such a manner as to allow tapered ends of modular units or accessories to be inserted into the aperture. The aperture arrangement or pattern may, whether equidistantly spaced or randomly spaced, be predetermined according to the multiple uses to be made of the cart.

If desired, the hollow portion of the deck may contain a foamed material such as polyurethane or polystyrene. The deck itself may be made of metal or a polymeric material such as high impact polystyrene, polypropylene, polyvinylchloride and various other polymers, copolymers and block copolymers. Enough space must be left between the outside walls and the apertures to allow the foam to flow into said space.

The basic structure of the invention consists of the deck, wheels and handle as described. The deck is adapted to receive various accessories or modules which are affixed to the deck by insertion of the accessory framework into the tapered deck apertures. The degree of taper on the ends of the accessory framework and the tapered deck apertures will be the same to provide for a sung fit and act as a stop for the accessories. The accessory framework well generally consist of plastic or metal tubing to which is attached various structural devices depending upon the use to be made of the cart. Specific embodiments for different uses will be illustrated in the drawings and detailed description which follows.

DRAWINGS

FIG. 1 is a perspective view of the basic structural unit including the deck, wheels and handle.

FIG. 2 is a cross sectional view of the deck taken along lines 2—2 of FIG. 1 showing the tapered apertures.

FIG. 3 is a perspective view of one embodiment of the invention containing a pegboard accessory inserted into apertures near the rear of the deck, said pegboard containing a basket.

DETAILED DESCRIPTION OF THE INVENTION

Figure 4:
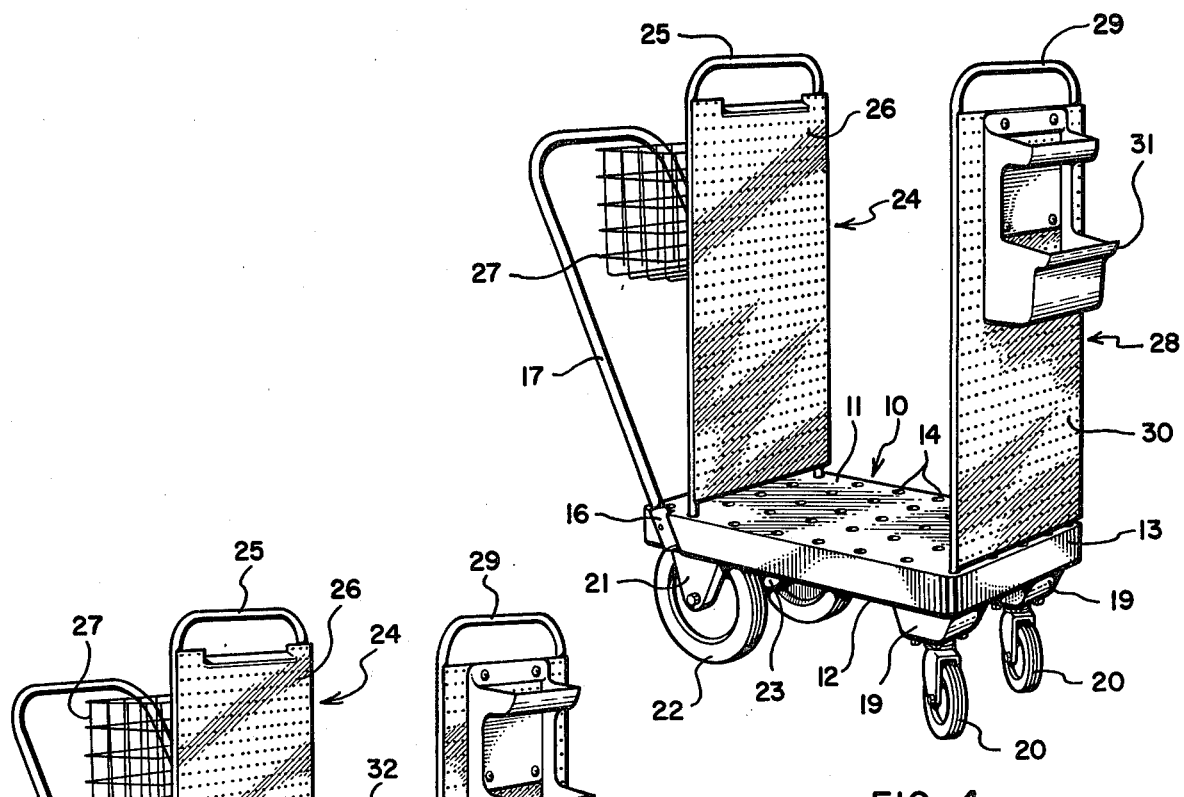
FIG. 4 is a perspective view of another embodiment of the invention showing pegboard accessories attached to both front and rear portions of the deck wherein each pegboard has attached thereto various carrying means.

There is shown in FIGS. 1 and 2 the basic features of the invention consisting of a deck 10 having an upper surface 11 and a lower surface 12. An outside wall 13 is contiguous with the upper and lower deck surfaces. The deck is preferably rectangular in shape and contains a series of apertures 14 which are tapered from top to bottom and are open at both ends as shown in FIG. 2. The aperture walls 15 interconnect both upper and lower deck surfaces and provide a honeycomb type of structural support to deck 10 thereby greatly strengthening the deck. With both ends of apertures 14 being opened, cleaning of the deck with water or other cleaning means is greatly facilitated.

Attached to or integral with the deck 10 are handle engaging means 16 into which handle 17 may be inserted. Handle 17 may be a solid or tubular rod appropriately bent to fit into the handle engaging means 17 on both sides of the rear portion of deck 10. The handle 17 extends backwardly and upwardly to the desired position.

Preferably the handle is secured by being inserted into walled apertures in the deck which apertures are open at both ends and the walls interconnect the top and bottom of the deck. The handle apertures are angled at the angle desired for the handle and are not tapered but are lined with a metal sleeve to allow for ready insertion and removal of the handle without unnecessary binding.

Although not shown, the wheels are located such that the cart can be tilted upright with the handle removed for compact storage.

Between the upper and lower deck surfaces 11 and 12 and surrounding the aperture walls is a hollow space 18. This type of construction allows a strong, rigid but relatively lightweight deck. If added strength is needed the hollow 18 may be filled with a foam such as polyurethane or polystyrene as already stated.

Integral with or attached to the lower surface 12 of the deck and extending downwardly therefrom are mounting means for the wheels. The means at the front end consist of downwardly extending blocks 19 or a single block adapted to receive castors 20 which swivel freely therein. At the rear are pairs of downwardly extending flanges 21 into which rear wheels 22 are inserted. Extending horizontally through the flanges 21 and rear wheel 22 is a rod or axel 23 about which wheels 22 are rotatable.

The basic structure shown in FIGS. 1 and 2 is useful without any added accessories for carrying bulk loads such as cartons, luggage, building materials and the like.

The adaptability of the basic structure to other uses is demonstrated by FIGS. 3 to 6. Other accessories are also possible and those shown are illustrative only and are not intended to be self limiting.

FIG. 3 illustrates a basic accessory in the form of a rear panel 24 comprising a tubular frame 25 the end portions of which are tapered to fit into apertures 14. Attached to frame 25 is a pegboard panel 26 which may be constructed of fiberboard or metal having holes randomly or equidistantly spaced apart. A carrier basket 27 is shown attached to the backside of panel 24. This embodiment is useful as a luggage caddy, warehouse dolly, or for carrying building materials and the like.

FIG. 4 aptly illustrates how modules can be added to the basic cart structure for different uses. In FIG. 4 a front panel 28 having a tubular frame 29 and pegboard 30 attached thereto is utilized. Attached to the front of panel 28 is a carrier 31. This modification is particularly adaptable for janitorial purposes. Cleaning solutions, brushes and clothes can be carried in the front and rear carriers 27 and 31. Mops, buckets and brooms can be carried on the deck surface.

Figure 5:
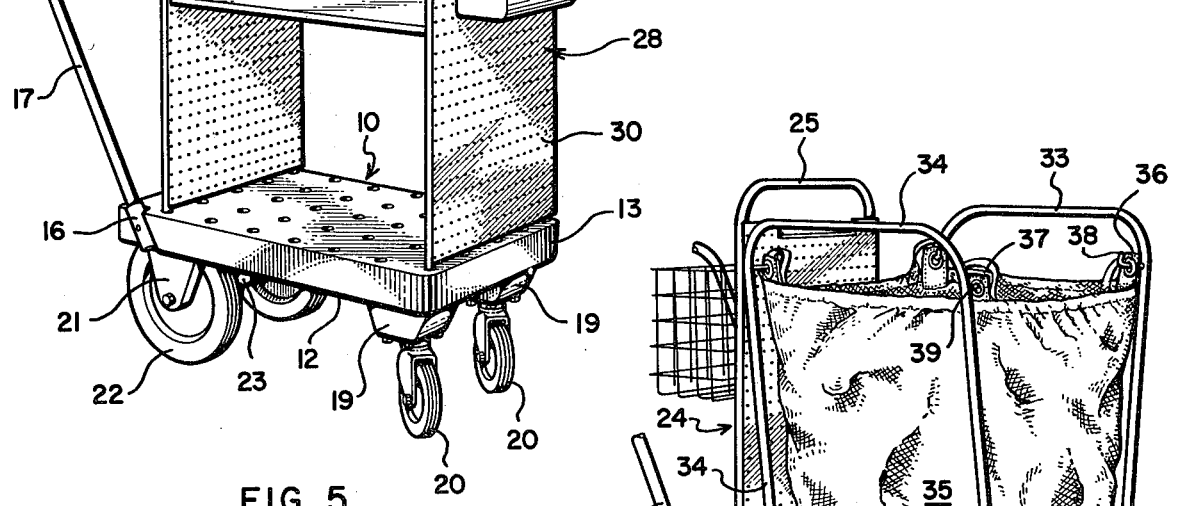
FIG. 5 is a perspective view of a still different embodiment of the invention showing a tray arrangement suspended from panels inserted in the apertures of the deck.

A simple modification of the cart of FIG. 4 is illustrated by FIG. 5. By interposing a shelf 32 between panels 24 and 29 the cart is transformed into a linen and cleaning cart for hotel, motel or hospital use. Clean linens can be carried on shelf 32 and soiled linens can be placed on deck 10. Shelf 32 is attachable to panels 24 and 28 by the use of conventional hardware used for pegboards. If desired, panels 24 and 28 and shelf 32 may be formed as an integral unit instead of being in modular form. Obviously other shelves can also be added rendering the cart useful for carrying dirty dishes from the table in a dining area to the dishwashing area or for transporting for from a kitchen over to a dining room.

Figure 6:
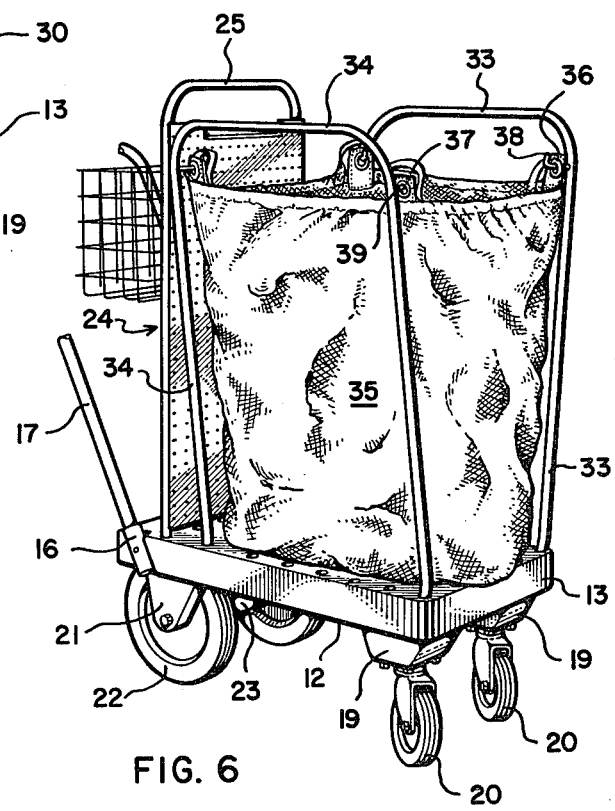
FIG. 6 shows yet another embodiment of the invention wherein tubular rods are inserted on each side of the deck and have a trash bag suspended therefrom in addition to containing a pegboard inserted into the rear portion of the deck.

To demonstrate the versatility of the cart another embodiment is shown in FIG. 6. In this modification two tubular frames 33 and 34 are placed longitudinally in apertures 14. The rear panel 24 remains in place. A bag 35 for holding trash is secured to frames 33 and 34 by inserting grommets 36 and 37 over prongs 38 and 39 in each frame.

While the above description shows several embodiments of the invention there are many more combinations of arrangements of modules connected to the deck which will render the cart suitable for even more uses. It is not the intention to limit the invention to those embodiments shown, rather the scope of the invention is to be limited only by the appended claims and their equivalents.

I claim:
1. A cart for multiple use comprising;
    (a) a deck having an upper and lower surface containing a series of walled apertures open at both ends extending between and continuous with the upper and lower surfaces, said apertures being in spaced relationship on the deck surfaces and being tapered such that the aperture diameter at the upper surface is greater than the diameter of the same aperture at the lower surface;
    (b) a set of front swivel wheels mounted to means in the lower front surface of the deck and a set of rear wheels mounted to means in the lower rear surface of the deck and,
    (c) handle means extending upwardly and rearwardly from the rear portion of the deck.
2. A cart according to claim 1 wherein the apertures are spaced apart in a predetermined pattern on the upper deck surface.
3. A cart according to claim 2 containing at least one module having tapered ends adapted to fit into the apertures in the deck.
4. A cart according to claim 3 containing a module in the form of a panel surrounded on three sides by a tubular framework support, the ends of which are tapered and inserted into apertures in the deck.
5. A cart according to claim 4 wherein the panel contains spaced holes into which is mounted one or more carrying means.
6. A cart according to claim 3 containing two modules in the form of panels surrounded on three sides by tubular framework supports, the ends of which are tapered and inserted into apertures in the deck such that the panels face each other.
7. A cart according to claim 6 having one or more shelves interposed between and fixedly attached to said facing panels.
8. A cart according to claim 6 wherein each panel has one or more carrying means attached thereto.
9. A cart according to claim 3 containing facing tubular modules tapered at the ends and bent such that the ends are parallel and are inserted into apertures in the deck.
10. A cart according to claim 9 wherein said facing tubular modules contain fastening means near the bent portions thereof to which are secured means in the corners of a bag situated between the modules.
11. A cart according to claim 10 wherein the fastening means in the tubular modules are prongs and the means in the corners of the bag are grommets.

* * * * *